United States Patent [19]
Cork

[11] Patent Number: 5,981,629
[45] Date of Patent: Nov. 9, 1999

[54] EPOXY SYSTEM FOR BONDING TO UNSANDED POLYMER-COATED FIBERGLASS SURFACES

[76] Inventor: Michael S. Cork, 2552 Honeysuckle, Richardson, Tex. 75082

[21] Appl. No.: 08/977,017

[22] Filed: Nov. 24, 1997

Related U.S. Application Data

[63] Continuation-in-part of application No. 08/672,975, Jul. 1, 1996, abandoned, which is a continuation-in-part of application No. 08/415,045, Mar. 31, 1995, Pat. No. 5,549,949.

[51] Int. Cl.⁶ .................................................. C08L 63/00
[52] U.S. Cl. ..................... 523/442; 523/457; 523/463; 525/504; 525/507; 525/523
[58] Field of Search ..................... 525/504, 507, 525/523; 523/442, 457, 463

[56] References Cited

U.S. PATENT DOCUMENTS

| | | | |
|---|---|---|---|
| 4,394,418 | 7/1983 | Temple | 523/404 |
| 4,608,300 | 8/1986 | Gruber | 428/285 |
| 4,829,134 | 5/1989 | Sakamoto et al. | 525/523 |
| 4,981,728 | 1/1991 | Homma et al. | 525/476 |
| 5,173,206 | 12/1992 | Dickens, Jr. et al. | 252/62.54 |
| 5,218,381 | 6/1993 | Narang et al. | 346/140 |
| 5,221,431 | 6/1993 | Choe et al. | 156/668 |
| 5,266,612 | 11/1993 | Kim et al. | 523/443 |
| 5,296,582 | 3/1994 | Fujita et al. | 525/476 |
| 5,298,299 | 3/1994 | Shea | 428/34.5 |
| 5,336,703 | 8/1994 | Homma et al. | 523/435 |
| 5,516,858 | 5/1996 | Morita et al. | 525/523 |
| 5,520,973 | 5/1996 | Kamen et al. | 428/35.7 |
| 5,665,797 | 9/1997 | Tahara et al. | 523/400 |

FOREIGN PATENT DOCUMENTS 6-257052  9/1994  Japan .

*Primary Examiner*—Randy Gulakowski
*Attorney, Agent, or Firm*—Donald Diamond

[57] ABSTRACT

A two-component system for forming a sealing composition for bonding to unsanded, polymer-coated fiberglass surfaces. The system includes a resin component containing a major amount of epoxy resin, glycidoxy silane (0–2.5 wt. %) and hydrophilic-modified polyolefin fiber (0.5–10 wt. %), and a curing agent component having a major amount of amine curing agent and which may also contain amino silane (0–5 wt. %). The resin component may also contain alpha-phase alumina (20–80 wt. %), ceramic fiber (2–25 wt. %), and mica (2–20 wt. %). In another formulation, the resin component contains glycidoxy silane (0–2.5 wt. %), hydrophilic-modified polyolefin fiber (0.5–10 wt. %), ceramic fiber (2–25 wt. %), anti-foam material (0.2–1.0 wt. %), and epoxy novolac resin to 100 wt. %. The curing agent component contains amino silane (0–5 wt. %) and amine curing agent to 100 wt. %.

32 Claims, No Drawings

EPOXY SYSTEM FOR BONDING TO UNSANDED POLYMER-COATED FIBERGLASS SURFACES

CROSS-REFERENCE TO RELATED APPLICATIONS

This application is a continuation-in-part of application Ser. No. 08/672,975 filed Jul. 1, 1996, entitled "Sealant for Bonding to Unsanded Polymeric Fiberglass Surface," now abandoned, which is a continuation-in-part of application Ser. No. 08/415,045, filed Mar. 31, 1995, issued on Aug. 27, 1996 as Pat. No. 5,549,949, entitled "Fume Duct Circumferential Joint Sealant." This patent is incorporated herein in its entirety by this reference.

BACKGROUND OF THE INVENTION

1. Field of the Invention

The present invention relates to two-component epoxy resin and amine hardener compositions and, more particularly, to two-component compositions for sealing the circumferential joint between pairs of polymer-coated fiberglass fume duct sections with unsanded mating surfaces.

2. Description of the Related Art

Ductwork for corrosive vapor exhaust systems is used extensively in industries which utilize hazardous chemicals to process raw materials or perform manufacturing procedures. Such ductwork also is required in research and development laboratories which use highly reactive, toxic or otherwise hazardous chemicals in conducting experiments. Pat. No. 5,549,949 ("'949") is directed to sealant compositions for sealing the circumferential joint between pairs of dual-laminate fume duct sections, and to a joint sealing method which provides strong bonding between the sealant and phenolic/glass and vinyl ester surfaces without first preparing the mating surfaces by sanding them. As discussed therein, ducts are fabricated as sections which are transported to a job site and assembled there. Since a leak-proof joint is required between each pair of contiguous sections, even the smallest installation requires a considerable number of such joints. Because mechanical interfacing of section ends cannot by itself prevent leakage, a sealant must be applied circumferentially to each interface. The most time-consuming step in joining dual-laminate sections has been preparing the resin-impregnated surfaces to which the sealant must bond in order to effect a leak-proof seal. Unless the surfaces to be mated are sanded, the interposing sealant layer will not uniformly adhere to the surfaces, resulting in porosities in the hardened sealant through which fumes can leak. Joints must not only prevent fumes from escaping in day-to-day operation, but must also maintain integrity after prolonged exposure to corrosive or otherwise reactive chemicals. Also, joints must not fail catastrophically in the event a flame propagates through the ductwork or, if exposed directly to heat, become a source of smoke particulates or other contaminants.

Because of the wide diversity of chemicals used in industrial and research applications, it has been extremely difficult to provide a single material for fabricating ductwork which can withstand all the chemicals to which duct interiors may be exposed. Over the past forty years the trend in materials has been away from bare and coated metals and toward the use of plastics, particularly fiberglass reinforced plastics (FRP's) which incorporate various types of resins which provide desirable properties. U.S. Pat. No. 5,298,299 to L. E. Shea is directed to a dual-laminate tubular duct section having both good chemical resistance and good fire resistance. An inner laminate is formed by coating a mylar wrapped mandrel with a chemically resistant resin such as a halogenated vinyl ester and then wrapping the mandrel with successive layers of FRP fabric material saturated with the resin. An outer laminate is then formed directly over the inner laminate by applying successive layers of FRP fabric material saturated with a resorcinol or phenol/resorcinol type fire-retardant resin.

The three resin compositions disclosed in the '949 patent are mixtures of resins of several types, including epoxy novolac resin, aromatic epoxide resin and aliphatic trifunctional epoxy resin, to which is added a minor amount of glycidoxy silane. Both curing agent compositions include two types of cycloaliphatic amines and an aromatic tertiary amine, and one composition further includes a minor amount of amino silane. Adhesive shear strength tests were conducted for the resultant six sealant combinations to compare bonding of sanded vis-a-vis unsanded surfaces of phenolic resin-impregnated laminates and vinyl resin-impregnated dual-laminates. The test results identified one especially preferred sealant combination for phenolic laminates, and one especially preferred sealant combination for vinyl laminates. In both cases, the ratio of mean adhesive shear strength for unsanded compared to sanded surfaces was 0.97.

In contrast, the present invention is directed to two-component systems whose resin composition contains organic and inorganic filler materials, and whose curing agent composition is either totally a single type of amine, or the amine and a minor amount of amino silane.

Adding fillers to epoxy resin compositions to improve thixotropic and mechanical properties is well known. U.S. Pat. No. 5,665,797 to S. Tahara discloses epoxy resin compositions for sealing liquid crystal display cells which include at least one organic and/or inorganic filler. Suitable organic fillers include powders of polyethylene, polypropylene, polyvinylchloride, polystyrene, polyvinylacetate, polystyrene-polyvinylacetate copolymer, polymethacrylate, polyurethane, polyester, urea resin, phenol resin and epoxy resin. Suitable inorganic fillers include carbonates such as calcium carbonate and magneisum carbonate, sulfates such as barium sulfate and magnesium sulfate, silicates such as aluminum silicate and zirconium silicate, oxides such as iron oxide, titanium oxide, aluminum oxide (alumina), silicon oxide (silica) and zinc oxide, and kaolon, talc, asbestos powder, quartz powder, mica and glass fiber. U.S. Pat. No. 5,266,612 to W. G. Kim et al. provides an epoxy novolac resin composition for sealing semiconductor elements which includes an inorganic filler such as high purity fused silica micro-particles in an amount by weight of 65 to 85 percent. U.S. Pat. No. 3,996,175 to B. Schreiber et al. discloses epoxide resin molding materials whose composition contains organic and/or inorganic fillers. Suitable organic fillers include cellulose, polyamide, polyester and polyacrylonitrile fibers. Suitable inorganic fillers include quartz flour, ground shale, calcined kaolin, powdered chalk, wollastonite, mica, aluminum oxide trihydrate, diopside, ground dolomite, talcum, barium sulfate, graphite and wood flour.

Using a mixture of amines as the curing agent for epoxide resin compositions is well known in the art. U.S. Pat. No. 4,608,300 to U. Gruber teaches that impregnating a fiber composite with a curable, liquid, solvent-free epoxide resin matrix containing as the curing agent a specific mixture of amines based on monoamines results in a moderately viscous composition which fully cures at relatively low temperature, viz., below 120° C. The matrix contains: (a) a liquid epoxide resin or a liquid mixture of epoxide resins; (b) an aliphatic or cycloaliphatic primary monoamine and/or a disecondary diamine; and (c) a tertiary amine which cures by catalysis or (d) a cycloaliphatic diamine or polyamine.

Combining epoxy resins and amino silanes is known. U.S. Pat. No. 5,173,206 to E. D. Dickens, Jr. et al. is directed to coating compositions which when applied to rare earth magnets reduce oxidation and/or inhibit corrosion. The compositions are formed by combining (a) an amino silane and (b) either an epoxy silane and/or an epoxy resin.

OBJECTS OF THE INVENTION

A primary object of the present invention is to provide an improved two-component system for blending and forming an ambient flowable and curable sealing composition which can be used for bonding unsanded, reinforced polymer-coated fiberglass surfaces.

Another object of the invention is to provide an improved two-component system for joining fume duct sections wherein each section has an inner laminate of fabric material such as fiberglass impregnated with a chemically resistant resin, and an outer laminate of fabric material such as fiberglass impregnated with a fire-retardant resin.

A further object of the invention is to provide a two-component system which can be applied directly to mating surfaces of duct fume joints without first requiring sanding of the surfaces.

Yet another object of the invention is to provide a fume duct sealant composition which contains a minimal amount of volatile organic solvent, and is smoke and flame retardant.

Other objects of the invention will become evident when the following description is considered.

SUMMARY OF THE INVENTION

These and other objects are met by the present invention which in one aspect provides a two-component system for blending and forming an ambient flowable and curable sealing composition for bonding to unsanded, reinforced polymer-coated fiberglass surface. The system includes a resin component ("Component A"), substantially free of solvent, having a major amount of epoxy resin, a minor amount of glycidoxy silane, and a minor amount of hydrophilic-modified polyolefin fiber. The system further includes a curing agent component ("Component B") having a major amount of amine curing agent substantially free of solvent, which may also include a minor amount of amino silane. Component A may also include inorganic filler material, specifically a major amount of alpha-phase alumina, a minor amount of ceramic fiber and a minor amount of mica.

In another aspect the invention provides a two-component system wherein Component A contains glycidoxy silane in an amount from 0.0 to about 2.5 wt. %, alpha-phase alumina in an amount from about 20 to about 80 wt. %, hydrophilic-modified polyolefin fiber in an amount from about 0.5 to about 10.0 wt. %, ceramic fiber in an amount from about 2.0 to about 25.0 wt. %, mica in an amount from about 2.0 to about 20.0 wt. %, and epoxy novolac resin to 100 wt. %. Component B contains amino silane in an amount from 0 to about 5 wt. %; and amine curing agent to 100 wt. %.

In still another aspect the invention provides a two-component system wherein Component A contains glycidoxy silane in an amount from 0.0 to about 2.5 wt. %, hydrophilic-modified polyolefin fiber in an amount from about 0.5 to about 10.0 wt. %, ceramic fiber in an amount from about 2.0 to about 25.0 wt. %, anti-foam material in an amount from about 0.2 to about 1.0 wt. %, and epoxy novolac resin to 100 wt. %. Component B contains amino silane in an amount from 0 to about 5 wt. %, and amine curing agent to 100 wt. %.

A more complete understanding of the present invention and other objects, aspects and advantages thereof will be gained from a consideration of the following description of the preferred embodiments.

DESCRIPTION OF THE PREFERRED EMBODIMENTS

I. Introduction

While the present invention is open to various modifications and alternative formulations, the preferred embodiments will be described herein in detail. It is to be understood, however, there is no intention to limit the invention to the particular forms disclosed. On the contrary, it is intended that the invention cover all modifications, equivalences and alternative formulations falling within the spirit and scope of the invention as expressed in the appended claims.

II. Two-Component System Compositions

A. A1 System Composition

Tables A1—1 and A1-2 show, respectively, a first resin composition and a first curing agent composition of a two-component system A1 used to adhesively bond seven specimens, each consisting of two pieces of generally planar dual-laminate duct section. The bond strength of each specimen was measured by destructive testing.

TABLE A1-1

| A1 Resin Composition | | |
|---|---|---|
| Constituent | Weight (g) | Wt. % |
| Epoxy novolac | 500 | 98.0 |
| Glycidoxy silane | 5 | 1.0 |
| Polyolefin fiber | 5 | 1.0 |

TABLE A1-2

| A1 Curing Agent Composition | | |
|---|---|---|
| Constituent | Weight (g) | Wt. % |
| Cycloaliphatic amine | 265 | 100.0 |

B. A2 System Composition

Tables A2-1 and A2-2 show, respectively, a second resin composition and the first curing agent composition of a two-component system A2. The same specimen preparation and testing procedures were used as for the A1 system.

TABLE A2-1

| A2 Resin Composition | | |
|---|---|---|
| Constituent | Weight (g) | Wt. % |
| Epoxy novolac | 200 | 48.3 |
| Glycidoxy silane | 2 | 0.5 |
| Alpha-phase alumina | 190 | 45.9 |
| Polyolefin fiber | 7 | 1.7 |

TABLE A2-1-continued

| A2 Resin Composition | | |
|---|---|---|
| Constituent | Weight (g) | Wt. % |
| Ceramic fiber | 5 | 1.2 |
| Mica | 10 | 2.4 |

TABLE A2-2

| A2 Curing Agent Composition | | |
|---|---|---|
| Constituent | Weight (g) | Wt. % |
| Cycloaliphatic amine | 129 | 100.0 |

C. A3 System Composition

Tables A3-1 and A3-2 show, respectively, a third resin composition and the first curing agent composition of a two-component system A3. The same specimen preparation and testing procedures were used as for the A1 system.

TABLE A3-1

| A3 Resin Composition | | |
|---|---|---|
| Constituent | Weight (g) | Wt. % |
| Epoxy novolac | 200 | 96.6 |
| Glycidoxy silane | 2 | 1.0 |
| Polyolefin fiber | 7 | 1.0 |
| Ceramic fiber | 5 | 1.2 |
| Anti-foam material | 0.5 | 0.2 |

TABLE A3-2

| A3 Curing Agent Composition | | |
|---|---|---|
| Constituent | Weight (g) | Wt. % |
| Cycloaliphatic amine | 129 | 100.0 |

D. B1 System Composition

Tables B1-1 and B1-2 show, respectively, the first resin composition and a second curing agent composition of a two-component system B1. The same specimen preparation and testing procedures were used as for the A1 system.

TABLE B1-1

| B1 Resin Composition | | |
|---|---|---|
| Constituent | Weight (g) | Wt. % |
| Epoxy novolac | 500 | 98.5 |
| Glycidoxy silane | 2.5 | 0.5 |
| Polyolefin fiber | 5 | 1.0 |

TABLE B1-2

| B1 Curing Agent Composition | | |
|---|---|---|
| Constituent | Weight (g) | Wt. % |
| Cycloaliphatic amine | 265 | 99.1 |
| Amino silane | 2.5 | 0.9 |

E. B2 System Composition

Tables B2-1 and B2-2 show, respectively, the second resin composition and the second curing agent composition of a two-component system B2. The same specimen preparation and testing procedures were used as for the A1 system.

TABLE B2-1

| B2 Resin Composition | | |
|---|---|---|
| Constituent | Weight (g) | Wt. % |
| Epoxy novolac | 200 | 48.5 |
| Glycidoxy silane | 1 | 0.2 |
| Alpha-phase alumina | 190 | 46.0 |
| Polyolefin fiber | 7 | 1.7 |
| Ceramic fiber | 5 | 1.2 |
| Mica | 10 | 2.4 |

TABLE B2-2

| B2 Curing Agent Composition | | |
|---|---|---|
| Constituent | Weight (g) | Wt. % |
| Cycloaliphatic amine | 129 | 99.2 |
| Amino silane | 1 | 0.8 |

F. B3 System Composition

Tables B3-1 and B3-2 show, respectively, the third resin composition and the second curing agent composition of a two-component B3. The same specimen preparation and testing procedures were used as for the A1 system.

TABLE B3-1

| B3 Resin Composition | | |
|---|---|---|
| Constituent | Weight (g) | Wt. % |
| Epoxy novolac | 200 | 97.1 |
| Glycidoxy silane | 1 | 0.5 |
| Polyolefin fiber | 2 | 1.0 |
| Ceramic fiber | 2.5 | 1.2 |
| Anti-foam material | 0.5 | 0.2 |

TABLE B3-2

| B3 Curing Agent Composition | | |
|---|---|---|
| Constituent | Weight (g) | Wt. % |
| Cycloaliphatic amine | 129 | 99.2 |
| Amino silane | 1 | 0.8 |

G. C1 System Composition

Tables C1-1 and C1-2 show, respectively, a fourth resin composition and the second curing agent composition of a two-component system C1. The same specimen preparation and testing procedures were used as for the A1 system.

TABLE C1-1

| C1 Resin Composition | | |
|---|---|---|
| Constituent | Weight (g) | Wt. % |
| Epoxy novolac | 500 | 99.0 |
| Polyolefin fiber | 5 | 1.0 |

TABLE C1-2

| C1 Curing Agent Composition | | |
|---|---|---|
| Constituent | Weight (g) | Wt. % |
| Cycloaliphatic amine | 265 | 99.0 |
| Amino silane | 5 | 1.0 |

H. C2 System Composition

Tables C2-1 and C2-2 show, respectively, a fifth resin composition and the second curing agent composition of a two-component system C2. The same specimen preparation and testing procedures were used as for the A1 system.

TABLE C2-1

| C2 Resin Composition | | |
|---|---|---|
| Constituent | Weight (g) | Wt. % |
| Epoxy novolac | 200 | 48.5 |
| Alpha-phase alumina | 190 | 46.1 |
| Polyolefin fiber | 7 | 1.7 |
| Ceramic fiber | 5 | 1.2 |
| Mica | 10 | 2.4 |

TABLE C2-2

| C2 Curing Agent Composition | | |
|---|---|---|
| Constituent | Weight (g) | Wt. % |
| Cycloaliphatic amine | 129 | 98.5 |
| Amino silane | 2 | 1.5 |

I. C3 System Composition

Tables C3-1 and C3-2 show, respectively, a sixth resin composition and the second curing agent composition of a two-component C3. The same specimen preparation and testing procedures were used as for the A1 system.

TABLE C3-1

| C3 Resin Composition | | |
|---|---|---|
| Constituent | Weight (g) | Wt. % |
| Epoxy novolac | 200 | 97.6 |
| Polyolefin fiber | 2 | 1.0 |
| Ceramic fiber | 2.5 | 1.2 |
| Anti-foam material | 0.5 | 0.2 |

TABLE C3-2

| C3 Curing Agent Composition | | |
|---|---|---|
| Constituent | Weight (g) | Wt. % |
| Cycloaliphatic amine | 129 | 98.5 |
| Amino silane | 2 | 1.5 |

III. Feasible and Preferred Compositions Ranges

Table D-1 shows feasible and preferred weight percentage ranges for the constituents of the resin component of systems A2, B2, C2, with epoxy novolac added to 100%. The curing agent component of systems A2, B2, C2 contains amino silane is an amount from 0 to about 5.0 wt. %, with amine curing agent added to 100%.

TABLE D-1

| Ranges of Resin Component Constituents | | |
|---|---|---|
| Constituent | Feasible Range (Wt. %) | Preferred Range (Wt. %) |
| Glycidoxy silane | 0.0–2.5 | 1.0–2.0 |
| Alpha-phase alumina | 20–80 | 40–60 |
| Polyolefin fiber | 0.5–10.0 | 1.0–7.0 |
| Ceramic fiber | 2.0–25.0 | 3.0–15.0 |
| Mica | 2.0–20.0 | 3.0–7.0 |

Table D-2 shows feasible and preferred weight percentage ranges for the constituents of the resin component of systems A3, B3, C3, with epoxy novolac added to 100%. The curing agent component of systems A3, B3, C3 contains amino silane is an amount from 0 to about 5.0 wt. %, with amine curing agent added to 100%.

TABLE D-2

| Ranges of Resin Component Constituents | | |
|---|---|---|
| Constituent | Feasible Range (Wt. %) | Preferred Range (Wt. %) |
| Glycidoxy silane | 0.0–2.5 | 1.0–2.0 |
| Polyolefin fiber | 0.5–10.0 | 1.0–7.0 |
| Ceramic fiber | 2.0–25.0 | 3.0–15.0 |
| Anti-foam material | 0.2–1.0 | 0.4–0.6 |

For the resin component constituents: Preferably, the epoxy novolac is EPON® Resin 160, a product of Shell Corporation. Alternatively, other epoxies may be used, singly or in combination. Preferably, the glycidoxy silane is gamma-Glycidoxypropyltrimethoxysilane, sold as product A-187 by OSI Specialties Group of Witco Company of Endicott, N.Y. Preferably, the alpha-phase alumina is micrograded aluminum oxide flour sold as ALUNDUM® by Norton Company Materials of Worcester, Mass. Preferably, the polyolefin fiber is high density polyethylene chopped microfiber whose surface has been hydrophilic-modified by being oxidized in the presence of a reactive gas such as fluorine. Such surface activated microfiber is sold as VISTAMER® PEF by Composite Particles, Inc. of Allentown, Pa. Alternatively, hydrophilic-modified polypropylene chopped microfiber or a mixture of hydrophilic-modified, chopped polyethylene and polypropylene microfibers can be used. Preferably, the ceramic fiber is FIBERFRAX® HS-70C fiber sold by The Carborundum Company of Niagara Falls, N.Y. Preferably, the mica is wet ground muscovite mica sold as product WG-325 by Franklin Industrial Minerals of Kings Mountain, N.C. Preferably, the anti-foam material is a methylalkylpolysiloxane sold as product BYK®-085 by BYK-Chemie Corporation of Wallingford, Conn.

For the curing agent constituents: Preferably, the amine curing agent is N-methylcyclohexylamine sold as ANCAMINE® 2280 curing agent by Air Products and Chemicals, Inc. of Allentown, Pa. Preferably, the amino silane is is N-beta-(Aminoethyl)-gamma-aminopropyltrimethoxysilane sold as product A-1120 by OSI Specialties Group of Witco Company of Endicott, N.Y.

IV. ADHESIVE BOND STRENGTH TEST RESULTS

A. Test Procedures

Adhesive shear strength tests on the dual-laminate specimens were performed by the Structural Composites Laboratory of the Civil Engineering Department at California State University, Long Beach. The tests were performed according to the single-lap shear test method prescribed in ASTM D3163. For all specimens, the adhesive bond thickness was in a narrow range between 0.015 inch and 0.020 inch so that test results could be meaningfully compared. Based on theory and experiment, the strength of an adhesive bond is generally inversely proportional to its thickness. That is, as bond thickness increases, the shear strength decreases.

All specimens were prepared at room temperature and humidity from 5/16-inch thick flat pieces having a width of about 1.0-inch and a length of about 12 to 14 inches, removed from rectangular duct as manufactured by ATS Products, Inc. of Richmond, Calif. Each piece consisted of chopped fiberglass and two resin-impregnated fiberglass woven rovings, with the surface to be bonded consisting of phenolic resin-impregnated 3.5 ounce boat cloth. The bonding area extended to a length of about 1.0-inch in the longitudinal direction of each specimen. No surface preparation was done except for removing any dust or other foreign substances using a cotton cloth dampened with water. Thus, the bonding surfaces were unsanded. The resin and curing agent components of each system were mixed together using a shear type mixer attached to a 1600 rpm rotating drill. After all the specimens were prepared, they were allowed to cure at 70° F. for at least 48 hours. For each of the nine systems, seven specimens were fabricated and the highest and lowest bond strengths discarded after testing was completed. Thus, the mean bond strength of each system was determined on the basis of five specimens.

A tensile load was applied at a rate of 1,300 psi per minute to each specimen until failure occurred. For all specimens, shear-type failure of the adhesive bond occurred in one of two characteristic modes. In one mode the shear failure plane was usually located at the interface between the cloth and the adjacent chopped glass. The cloth was attached to the adhesive, indicating that the cloth had failed rather than the bond. In another mode the failure plane extended down to the closest woven roving. The cloth and the chopped fiberglass between the cloth and first woven roving had failed and were attached to the bond. A third type of failure was not observed, wherein the failure plane is at the adhesive-duct interface and the phenolic resin originally on the cloth exterior surface is attached to the adhesive and totally removed from the cloth. After a sample failed, the length and width of the bond area were measured. The adhesive bond strength was obtained by dividing the load at which failure occurred by the measured bond surface area. Table E shows the mean bond strength in psi (lbs/in$^2$) for each system A1, A2, A3, B1, B2, B3, C1, C2, C3.

TABLE E

Phenolic Laminate Shear Test Results

| System | Bond Strength (psi) |
| --- | --- |
| A1 | 754 ± 57 |
| A2 | 616 ± 56 |
| A3 | 616 ± 37 |

TABLE E-continued

Phenolic Laminate Shear Test Results

| System | Bond Strength (psi) |
| --- | --- |
| B1 | 714 ± 25 |
| B2 | 651 ± 47 |
| B3 | 669 ± 17 |
| C1 | 474 ± 44 |
| C2 | 632 ± 26 |
| C3 | 604 ± 22 |

That which is claimed is:

1. A two-component system for blending and forming an ambient flowable and curable sealing composition for bonding, to unsanded, reinforced polymer-coated fiberglass surface, said two-component system comprising:
   (i) Component A comprising a major amount of epoxy resin, a minor amount of glycidoxy silane, and a minor amount of hydrophilic-modified polyolefin fiber, wherein said major and minor amounts are based on the total amount of Component A, said Component A being substantially free of solvent; and
   (ii) Component B comprising a major amount of amine curing agent, said major amount being based on the total amount of Component B, said curing agent being present in an amount to effectively cure said epoxy resin, said Component B being substantially free of solvent.

2. The two-component system of claim 1, wherein Component B further comprises a minor amount of amino silane, said minor amount being based on the total amount of Component B.

3. The two-component system of claim 1, wherein said epoxy resin comprises at least one epoxy novolac resin.

4. The two-component system of claim 2, wherein said epoxy resin comprises at least one epoxy novolac resin.

5. The two-component system of claim 3, wherein said polyolefin fiber comprises chopped, oxidized polyethylene microfibers.

6. The two-component system of claim 3, wherein said polyolefin fiber comprises chopped, oxidized polypropylene microfibers.

7. The two-component system of claim 3, wherein said polyolefin fiber comprises a mixture of chopped, oxidized polyethylene and polypropylene microfibers.

8. The two-component system of claim 3, wherein Component A further comprises inorganic filler material.

9. The two-component system of claim 8, wherein said inorganic filler material comprises a major amount of alpha-phase alumina, said major amount being based on the total amount of Component A.

10. The two-component system of claim 8, wherein said inorganic filler material comprises a minor amount of ceramic fiber, said minor amount being based on the total amount of Component A.

11. The two-component system of claim 8, wherein said inorganic filler material comprises a minor amount of mica, said minor amount being based on the total amount of Component A.

12. The two-component system of claim 8, wherein said inorganic filler material comprises a major amount of alpha-phase alumina, a minor amount of ceramic fiber, and a minor amount of mica, said major and minor amounts being based on the total amount of Component A.

13. The two-component system of claim 4, wherein said polyolefin fiber comprises chopped, oxidized polyethylene microfibers.

14. The two-component system of claim 4, wherein said polyolefin fiber comprises chopped, oxidized polypropylene microfibers.

15. The two-component system of claim 4, wherein said polyolefin fiber comprises a mixture of chopped, oxidized polyethylene and polypropylene microfibers.

16. The two-component system of claim 4, wherein Component A further comprises inorganic filler material.

17. The two-component system of claim 16, wherein said inorganic filler material comprises a major amount of alpha-phase alumina, said major amount being based on the total amount of Component A.

18. The two-component system of claim 16, wherein said inorganic filler material comprises a minor amount of ceramic fiber, said minor amount being based on the total amount of Component A.

19. The two-component system of claim 16, wherein said inorganic filler material comprises a minor amount of mica, said minor amount being based on the total amount of Component A.

20. The two-component system of claim 16, wherein said inorganic filler material comprises a major amount of alpha-phase alumina, a minor amount of ceramic fiber, and a minor amount of mica, said major and minor amounts being based on the total amount of Component A.

21. The two-component system of claim 1, wherein said glycidoxy silane is gamma-Glycidoxypropyltrimethoxysilane, and said amine curing agent is N-methylcyclohexylamine.

22. The two-component system of claim 2, wherein said amino silane is N-beta-(Aminoethyl)-gamma-aminopropyltrimethoxysilane.

23. A two-component system for blending and forming an ambient flowable and curable sealing composition for bonding to unsanded, reinforced polymer-coated fiberglass surface, said two-component system comprising:
   (i) Component A containing glycidoxy silane in an amount from 0.0 to about 2.5 wt. %; alpha-phase alumina in an amount from about 20 to about 80 wt. %; hydrophilic-modified polyolefin fiber in an amount from about 0.5 to about 10.0 wt. %; ceramic fiber in an amount from about 2.0 to about 25.0 wt. %; mica in an amount from about 2.0 to about 20.0 wt. %; and epoxy novolac resin to 100 wt. %, said percentage weights based on the total weight of Component A; and
   (ii) Component B containing amino silane in an amount from 0 to about 5 wt. %; and amine curing agent to 100 wt. %, said percentage weights based on the total weight of Component B.

24. The two-component system of claim 23, wherein:
   said glycidoxy silane is gamma-Glycidoxypropyltrimethoxysilane;
   said amino silane is N-beta-(Aminoethyl)-gamma-aminopropyltrimethoxysilane; and
   said amine curing agent is N-methylcyclohexylamine.

25. The two-component system of claim 24, wherein said polyolefin fiber is chopped, oxidized polyethylene microfibers.

26. The two-component system of claim 24, wherein said polyolefin fiber is chopped, oxidized polypropylene microfibers.

27. The two-component system of claim 24, wherein said polyolefin fiber is a mixture of chopped, oxidized polyethylene and polypropylene microfibers.

28. A two-component system for blending and forming an ambient flowable and curable sealing composition for bonding to unsanded, reinforced polymer-coated fiberglass surface, said two-component system comprising:
   (i) Component A containing glycidoxy silane in an amount from 0.0 to about 2.5 wt. %; hydrophilic-modified polyolefin fiber in an amount from about 0.5 to about 10.0 wt. %; ceramic fiber in an amount from about 2.0 to about 25.0 wt. %; anti-foam material in an amount from about 0.2 to about 1.0 wt. %; and epoxy novolac resin to 100 wt. %, said percentage weights based on the total weight of Component A; and
   (ii) Component B containing amino silane in an amount from 0 to about 5 wt. %; and amine curing agent to 100 wt. %, said percentage weights based on the total weight of Component B.

29. The two-component system of claim 28, wherein:
   said glycidoxy silane is gamma-Glycidoxypropyltrimethoxysilane;
   said amino silane is N-beta-(Aminoethyl)-gamma-aminopropyltrimethoxysilane; and
   said amine curing agent is N-methylcyclohexylamine.

30. The two-component system of claim 28, wherein said polyolefin fiber is chopped, oxidized polyethylene microfibers.

31. The two-component system of claim 28, wherein said polyolefin fiber is chopped, oxidized polypropylene microfibers.

32. The two-component system of claim 28, wherein said polyolefin fiber is a mixture of chopped, oxidized polyethylene and polypropylene microfibers.

* * * * *